United States Patent [19]

Merrill, Jr.

[11] Patent Number: 5,372,200
[45] Date of Patent: Dec. 13, 1994

[54] METHOD AND APPARATUS FOR SEALING A WELLBORE OR WELL CASING SCREEN

[75] Inventor: LaVaun S. Merrill, Jr., Englewood, Colo.

[73] Assignee: Marathon Oil Company, Findlay, Ohio

[21] Appl. No.: 990,563

[22] Filed: Dec. 14, 1992

[51] Int. Cl.⁵ .................... E21B 33/127; E21B 43/12
[52] U.S. Cl. .................................. 166/369; 166/187; 166/370; 166/387
[58] Field of Search ............... 166/187, 369, 370, 277, 166/387; 277/34.3; 138/93

[56] References Cited

U.S. PATENT DOCUMENTS

| | | | |
|---|---|---|---|
| 2,174,795 | 10/1939 | Layne | 166/20 |
| 2,201,096 | 5/1940 | Kerman | 166/187 X |
| 2,583,316 | 1/1952 | Bannister | 166/4 |
| 3,039,533 | 6/1962 | Lacey | 166/187 X |
| 3,428,124 | 2/1969 | Armstrong | 166/187 |
| 3,945,436 | 3/1976 | Nebolsine | 166/187 X |
| 3,946,761 | 3/1976 | Thompson et al. | 138/98 |
| 4,268,043 | 5/1981 | Forssell | 166/187 X |
| 4,372,389 | 2/1983 | Hamrick et al. | 166/369 |
| 5,048,605 | 9/1991 | Toon et al. | 166/187 |
| 5,226,485 | 7/1993 | Dobscha et al. | 166/387 |

FOREIGN PATENT DOCUMENTS

| | | | |
|---|---|---|---|
| 132539 | 3/1933 | Germany | 166/187 |
| 184670 | 7/1963 | Sweden | 166/187 |

*Primary Examiner*—Hoang C. Dang

[57] ABSTRACT

A method and apparatus for sealing a section of screened well casing, especially useful in soil venting wells. A foamed rubber sleeve surrounding a pipe is caused to collapse when suction is drawn on the annulus between the pipe and sleeve, allowing the pipe and sleeve to be lowered into place. When the annulus is pressurized the sleeve expands out against the screen to seal the contacted portion against the passage of air.

5 Claims, 3 Drawing Sheets

METHOD AND APPARATUS FOR SEALING A WELLBORE OR WELL CASING SCREEN

FIELD OF THE INVENTION

This invention relates to the sealing of a well screen. More particularly, it relates to a method and apparatus for sealing a relatively long section of screen such as the type found in a soil venting well.

BACKGROUND OF THE INVENTION

The need to provide a seal in a pipe or well casing at a point remote from the surface has resulted in the design of a great number of different methods and related equipment. Most are designed to function under special conditions, including those found in deep wells where high temperatures and pressures or corrosive materials are encountered. While such sealing means are for the most part adequate for the purpose, they are too complex and expensive for applications in more moderate environments.

One area where there is a need for a simple, inexpensive remotely actuated seal is in the remediation of contaminated vadose zone soil through the operation of soil venting wells. Soil venting is an in-situ method of extracting vapor from volatile and semivolatile petroleum hydrocarbons and removing adsorbed liquid hydrocarbons from the vadose zone. In this method air is drawn between soil particles to volatilize the contaminant and accelerate the evaporation rate of the adsorbed hydrocarbons, and is then vented to the surface through vent wells.

In carrying out a soil venting process a relatively shallow wellbore is drilled in the vadose zone and a casing containing openings for the passage of air is installed. Typically, the casing includes a screened section for this purpose which extends for a substantial distance along the length of the casing. When suction is drawn on the vent well to draw air from the surface down through the soil, the air tends to follow the shortest flow path from the area immediately surrounding the wellbore to the upper portion of the screened section. To change the flow path in order to treat soil outside of this area it has been suggested to seal off the portion of the casing screen through which air has been flowing to force the air to flow through a lower section of the screen. To accomplish this, however, an economical, efficient sealing mechanism is required. Although existing packers could be modified to allow them to seal a longer length of a casing screen, the complexity and expense of the modified packers would be out of proportion to the relatively inexpensive venting operation.

There is thus a need for an efficient means of simple design for sealing a long section of screened casing in a vent well, and it is an object of the invention to provide a method and apparatus for that purpose.

BRIEF SUMMARY OF THE INVENTION

The apparatus of the invention comprises a pipe which is at least as long as the section of well casing screen to be sealed and which has an outside diameter that is less than the inside diameter of the screen. A flexible air impermeable sleeve having an inside diameter greater than the outside diameter of the pipe surrounds the pipe to form an annulus therebetween. The ends of the annulus are sealed and a tube is provided which extends from the annulus to a location, typically at the surface, where suction or pressure can be applied through the tube. When suction is drawn on the annulus the sleeve is caused to collapse toward the pipe to reduce the outside diameter of the sleeve so that it is less than the inside diameter of the screen, thereby allowing the sealing device to be lowered into the well. When pressure is applied to the annulus the sleeve is caused to expand to increase the outside diameter of the sleeve so that it is brought into sealing contact with the screen. Preferably, the flexible air impermeable sleeve comprises a resilient closed cell foamed insulation material, such as foamed rubber.

Although the sealing device may find use in various environments, it is of particular utility when used in a soil venting well in that it is ideally suited to seal off a long length of a casing screen while leaving lower portions of the screen open to permit continued flow of air through the well. It is inexpensive to construct as well as being simple and efficient to use.

These and other features of the invention will be made more clear in the detailed description of the preferred embodiment.

DETAILED DESCRIPTION OF THE PREFERRED EMBODIMENT

Figures 1, 2:
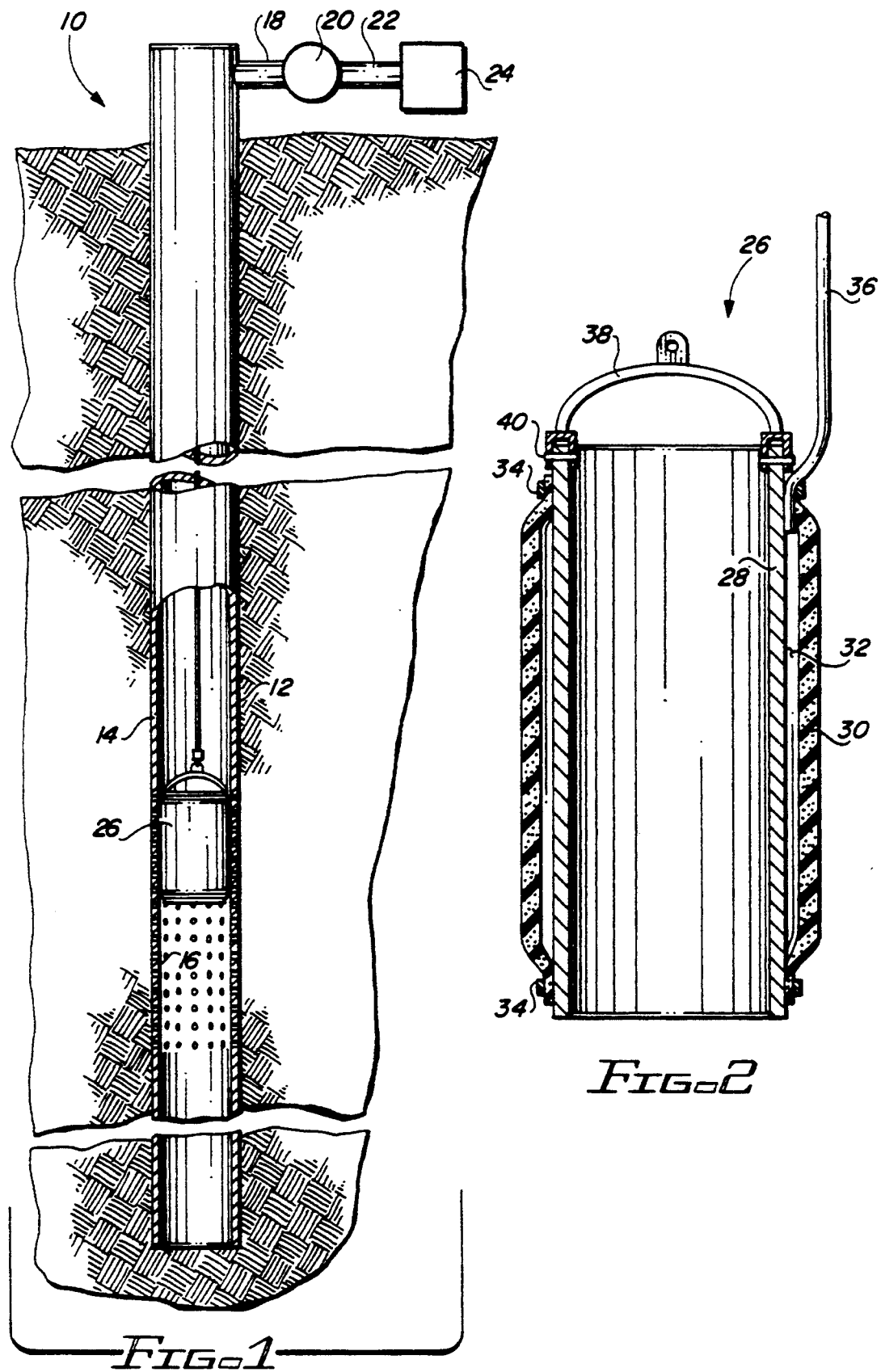
FIG. 1 is a schematic view, shown partially in longitudinal section, of a soil venting well in which the sealing device of the invention has been installed.
FIG. 2 is a longitudinal sectional view of the sealing device.

Referring to FIG. 1, a typical soil vent well 10 in which the invention finds particular use is comprised of a wellbore 12 and a casing 14 within the bore. The casing includes a screen section 16 which extends throughout a substantial portion of the length of the casing, providing apertures or passageways through which air may pass. The casing is shown as extending above the ground surface, with the above-ground portion connected, as by a tee, to a lateral conduit 18 leading to an air blower or fan 20. By reducing the pressure in the casing through operation of the blower, air is drawn from the surface through the soil and screen and into the casing. Air passing through the blower may continue through a conduit 22 to a treatment area 24, where it may be treated by any suitable process, not shown, such as an activated charcoal filter.

In order to alter the flow path of the air through the soil it has been suggested to block the flow through the upper portion of the screen, thereby causing air to flow through areas more distant from the well and deeper than the soil through which air previously flowed. According to the present invention, the sealing device 26 of the present invention closes off the upper portion of the screened casing section 16.

Referring to FIG. 2, the sealing device 26 comprises a pipe 28 having an outside diameter less than the inside diameter of the well casing in which it is to be located. Surrounding the pipe is a sleeve 30 of flexible air impermeable material. The inside diameter of the sleeve is slightly greater than the outside diameter of the pipe so that an annulus 32 is formed between the sleeve and pipe. The upper and lower ends of the sleeve are tightly secured against the pipe, as by clamps or rings 34, to seal off the annulus, and a tube 36 extends from the annulus to a point outside the device. A pipe support 38, which may comprise a rod or cable or any other suitable support arrangement, is attached to the upper end of the pipe, as by bolts or pins 40, to enable the device to be raised or lowered by a line.

Figure 3:
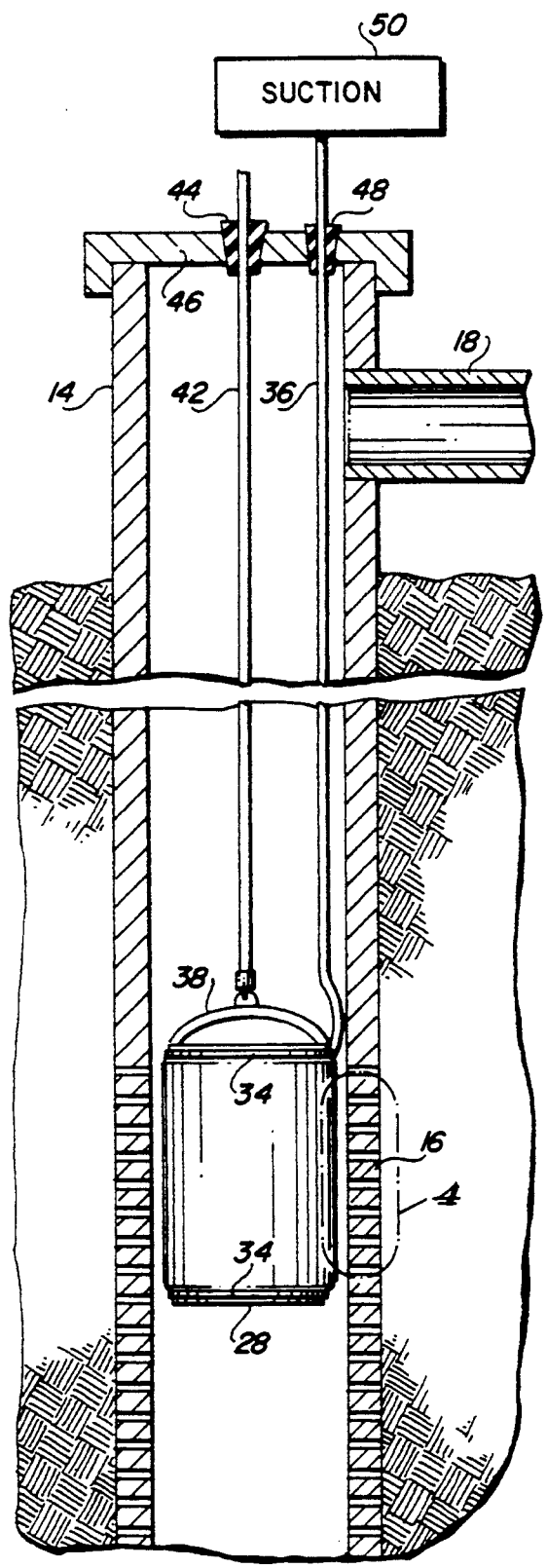
FIG. 3 is a partial longitudinal sectional view of a soil venting well showing the sealing device in the process of being installed in the well.
Figure 4:
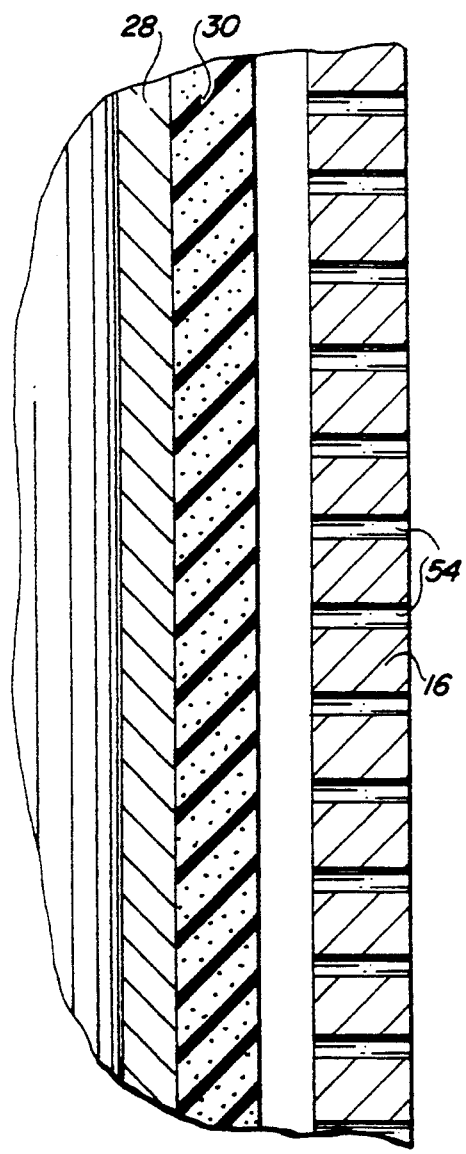
FIG. 4 is an enlarged partial sectional view of the area enclosed in the circle 4 of FIG. 3.

Referring to FIG. 3, in practice the device is introduced to the well through the upper end of the casing 14 and is lowered by line 42 to a point adjacent the portion of the casing screen to be sealed. The line 42 extends to the surface through a rubber stopper 44 or other suitable sealed opening in the casing lid 46, and the tube 36 extends through a similar rubber stopper 48. The tube 36 is connected at the surface to a small vacuum pump or other source of suction 50 so that a vacuum can be drawn on the annulus 32 between the pipe 28 and the sleeve 30. When suction is drawn the sleeve collapses toward the pipe to minimize the width of the annulus, which causes the outer surface of the sleeve to move away from the casing. The spaced relationship of the sleeve and casing allows the sealing device to freely move down into the casing. This is illustrated more clearly in FIG. 4, which shows the sleeve 30 in contact with the pipe 28 during the positioning operation. Although the flexible nature of the sleeve would typically result in the sleeve collapsing and contacting the pipe, as shown, when a vacuum is drawn on the annulus, it is not essential that the sleeve be drawn into actual contact with the pipe. Use of a less flexible sleeve or a less severe reduction in pressure in the annulus may simply cause the sleeve to be drawn toward the pipe to a point still short of the pipe wall. However, if this results in the outer face of the sleeve being spaced from the casing a sufficient amount so as not to interfere with the travel of the device down the casing, such an arrangement would be adequate.

Figure 5:
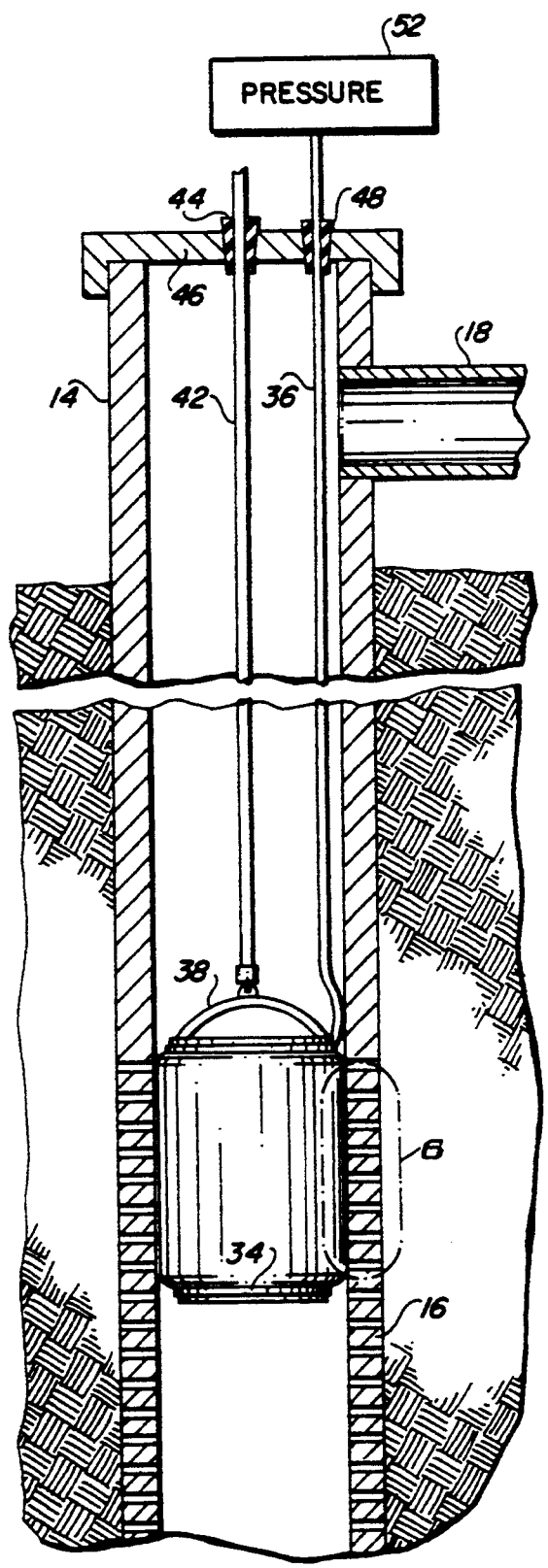
FIG. 5 is a partial longitudinal sectional view of a soil venting well similar to the view of FIG. 3, but showing the device in sealing condition after it has been installed.
Figure 6:
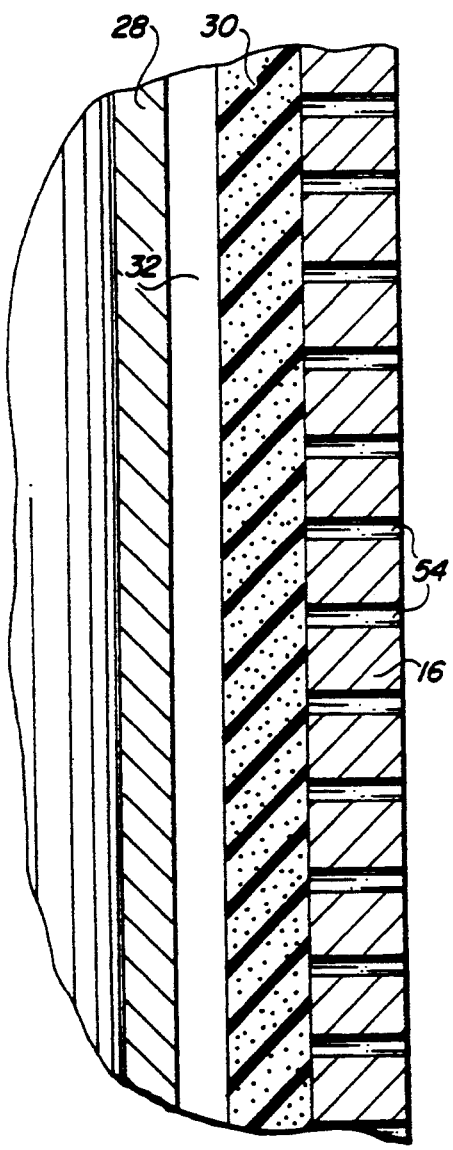
FIG. 6 is an enlarged partial sectional view of the area enclosed in the circle 6 of FIG. 5.

As shown in FIG. 5, pressure is applied by a suitable pressure source 52 through the tube 36 to the annulus between the pipe 28 and sleeve 30 when it is desired to close off the adjacent openings 54 in the casing screen 16. This increases the size of the annulus 32 and forces the sleeve radially outward until the sleeve engages the openings, as illustrated in FIG. 6, and seals them off against the flow of air. Operation of the vent well then continues, with air being drawn by the blower 20 through the openings in the casing below the sleeve 30 and continuing up through the pipe 28 and the upper portions of the casing 14. If it is subsequently desired to seal off still lower portions of the casing screen, it is merely necessary to withdraw the sealing device and replace it with a longer one in order to block the new section of screen in addition to the previous blocked section.

Although the openings through which air flows into the casing have been referred to as part of a casing screen, which is a typical arrangement, the invention is not dependent upon the use of a screen. Any type of openings in the casing that allow continuous air flow without permitting the surrounding soil to penetrate the casing can be employed. Those skilled in the art will recognize that the invention may also be used in connection with an uncased wellbore by blocking off sections of the wellbore in the same manner as described above.

The sleeve may be formed of any suitable material that is impermeable to air and sufficiently flexible to move in a radial direction with respect to the pipe in response to changes in pressure in the annulus between the pipe and sleeve. A preferred material is a closed cell resilient foamed insulating material, such as foamed rubber, which is commercially available in the form of pipe insulation. It is inexpensive, capable of being sealed at its ends by a simple clamp arrangement and easily radially distorted by decreased or increased annulus pressure. It is soft enough to seal at a low annulus pressure and it will seal around a small diameter tubing run into the annulus at the pipe clamp. Its resilient nature further prevents the tubing passage from being blocked by compression of the tube wall due to the force of the clamp on the face of the sleeve.

Although the dimensions of the components of the sealing device may vary as dictated by the situation, it is preferred that the inside diameter of the pipe be as great as practicable in order not to restrict the flow of air up the casing. The invention is conducive to such an arrangement since the impermeable sleeve needs to be capable of only minimal radial movement in order to seal the sleeve against the casing screen or to disengage it to permit movement of the sealing device through the casing. For example, the clearance of the collapsed sleeve to the casing should probably not be more than $\frac{1}{4}$ inch to prevent exerting too much strain on the sleeve at the clamped ends. Since the sleeve material does not collapse much under the pressure and vacuum required, the annulus would also not be more than about $\frac{1}{4}$ inch.

It can now be appreciated that the invention provides a simple, reliable and efficient way to seal openings throughout a substantial length of well casing. Although a preferred embodiment of the invention has been described, it will be understood that it is possible to make changes to certain specific details of the preferred embodiment without departing from the spirit and scope of the invention, as defined in the appended claims.

What is claimed is:

1. In the operation of a soil venting well having a cased wellbore and openings throughout a substantial portion of the length of the casing to allow air to flow into the well and up to the surface, a method of limiting the air flow to a portion of the openings, comprising:

providing a pipe having an outside diameter less than the inside diameter of the casing;

surrounding the pipe with a flexible air impermeable sleeve so as to form an annulus therebetween;

sealing the ends of the annulus;

decreasing the pressure in the annulus to cause the sleeve to collapse toward the pipe so that the outside diameter of the sleeve is less than the inside diameter of the casing;

lowering the pipe in the casing to a position adjacent the section of casing desired to be sealed;

increasing the pressure in the annulus to cause the sleeve to expand toward the casing until the sleeve engages adjacent openings in the casing and seals the openings against air flow; and flowing air from soil surrounding the well through openings in the casing below the sleeve, through the pipe, and to the surface.

2. A method of sealing a section of casing in a soil venting well according to claim 1, wherein the flexible air impermeable sleeve comprises a resilient closed cell foamed insulation material.

3. A method of sealing a section of casing in a soil venting well according to claim 2, wherein the closed cell material is foamed rubber.

4. A method of sealing a section of casing in a soil venting well according to claim 1, wherein the ends of the annulus are sealed by clamping the ends of the flexible air impermeable sleeve to the pipe.

5. A method of sealing a section of casing in a soil venting well according to claim 1, wherein the pressure in the annulus is increased and decreased by connecting a tube from the annulus to a means for increasing and decreasing the pressure.

* * * * *